United States Patent [19]

Darley

[11] Patent Number: 5,122,315
[45] Date of Patent: Jun. 16, 1992

[54] METHOD AND APPARATUS FOR MONITORING AND CONTROLLING THERMOPLASTIC EXTRUDER OUTPUT

[75] Inventor: Dana G. Darley, Charlotte, N.C.

[73] Assignee: Luwa Corporation, Charlotte, N.C.

[21] Appl. No.: 516,432

[22] Filed: Apr. 30, 1990

[51] Int. Cl.⁵ .................. B29C 47/10; B29C 47/92
[52] U.S. Cl. .................. 264/40.1; 264/40.4; 264/40.7; 364/473; 364/567; 364/568; 366/141; 425/140; 425/148
[58] Field of Search .................. 264/40.1, 40.3, 40.4, 264/40.7, 211.12, 349; 425/140, 148, 207, 377; 366/79, 141, 142; 364/469, 473, 476, 567, 568

[56] References Cited

U.S. PATENT DOCUMENTS

| | | | |
|---|---|---|---|
| 4,013,745 | 3/1977 | Brinkmann et al. | 264/40.4 X |
| 4,101,613 | 7/1978 | Norwood | 264/40.3 |
| 4,209,476 | 6/1980 | Harris | 264/40.4 |
| 4,452,750 | 6/1984 | Handwerk et al. | 264/40.3 |
| 4,478,775 | 10/1984 | Endo et al. | 264/40.3 |
| 4,501,498 | 2/1985 | McKelvey | 366/69 |
| 4,663,103 | 5/1987 | McCullough et al. | 264/40.4 |
| 4,944,903 | 7/1990 | Nilsson | 264/40.1 |

OTHER PUBLICATIONS

Paper by Daniel J. Smith and Dana G. Darley "Making The Right Choice: Gear Pumps or Gravimetric Extrusion Control" (Oct. 1989).
Article by Debbie Stover, "Gravimetric Control for Extrusion Lines Crosses the Atlantic" (May 1989).

*Primary Examiner*—Leo S. Tentoni
*Attorney, Agent, or Firm*—Shefte, Pinckney & Sawyer

[57] ABSTRACT

In a gear pump assisted thermoplastic extrusion system, the speed of operation of the gear pump is adjusted in relation to fluctuations in both the rate of product output from the system and the rate of material input to the system to precisely maintain a desired weight per unit length of the extruded product within close tolerances.

18 Claims, 1 Drawing Sheet

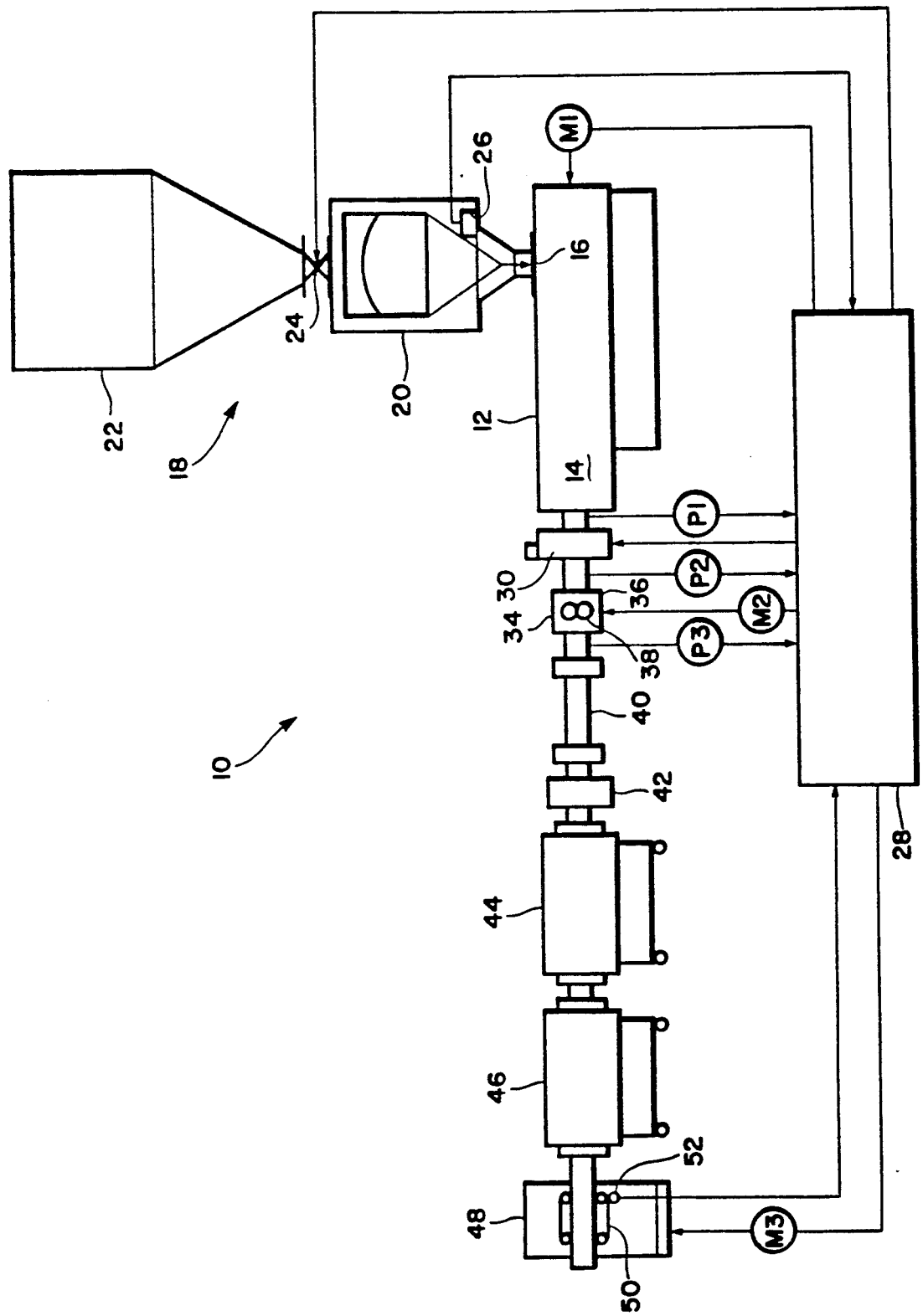

METHOD AND APPARATUS FOR MONITORING AND CONTROLLING THERMOPLASTIC EXTRUDER OUTPUT

BACKGROUND OF THE INVENTION

The present invention relates generally to methods and apparatus for extruding thermoplastic material and, more particularly, to methods and apparatus for monitoring and controlling deviations in the output of a thermoplastic extruder from predetermined desired extruder output parameters.

Many various forms of thermoplastic polymeric material are conventionally extruded into a wide variety of products including sheets, film, rods, tubes, strands as well as various other products. Basically, the extrusion process involves melting of the thermoplastic material employed, and sufficient pressurization of the melted material to cause it to flow, at a desired rate, through an appropriate die to form the intended end product. An important determination of the quality of the end product is its conformity, within acceptable tolerances, to predetermined dimensional and weight specifications. As a general principle, the quality of an extruded product tends to decrease as the extrusion rate increases. Over the years, it has therefore been an ongoing problem in the industry in striking an acceptable balance between an economical rate of extrusion and an acceptable quality of the extruded product.

Conventional apparatus for extruding thermoplastic material typically includes a cylindrical barrel in which is rotatably disposed a conveying screw. The thermoplastic material is fed is a solid pellet or powder form into the barrel at one end and conveyed to the other end of the barrel by rotation of the screw. The heat required to transform the thermoplastic material from a solid at room temperature to a molten material at the desired extrudate temperature is typically generated by equipping the extruder with heating elements.

Conventional extruders are widely recognized to be disadvantageously subject to undesirable deviations in the quality of the extruded product. While the volumetric input of thermoplastic material to the extruder and the operational parameters of the extruder, e.g., rotational speed of the screw and temperature of the extruder heaters, may be maintained substantially constant, variations in the thermoplastic material such as its density and viscosity as well as variations in the operating conditions of the extruder such as uneven temperature distribution and backpressurization cause unacceptable variations in the quality of the extruded product exceeding established tolerances. When such variations result in an extruded product exceeding established thickness specifications by more than the acceptable tolerance, the extruder utilizes an excessive amount of thermoplastic material and, in turn, the profitability of the extruder suffers. When such variations result in an extruded product of a thickness less than established thickness specifications by more than the acceptable tolerance, the product is defective and unsalable.

In recent years, various techniques and approaches have been developed to attempt to control deviations in the output of extrusion systems to avoid these problems. One such approach is to utilize a gear pump following the extruder to meter the delivery of the molten thermoplastic material to the forming die. The basic construction and operation of gear pumps is well known, basically including a pair of counter-rotating intermeshing gears driven within a pump housing to transport the molten thermoplastic material in a positive displacement manner by entrapping the material between the teeth of the gears. As a result, the volumetric output of a gear pump is a function of its operational speed and is substantially unaffected by pressure surges and fluctuations in the input flow of thermoplastic material from the extruder. As a result, the use of a gear pump reduces variations in the quality of the extruded product, both on short term and long term bases, by delivering a substantially uniform volumetric flow of thermoplastic material to the die of the extrusion system. However, variations in the density of the thermoplastic material are substantially unaffected by the use of a gear pump and, therefore, such variations may still product deviations in the weight per unit length of the extruded product.

More recently, considerable interest has developed in the utilization of so-called gravimetric extrusion control systems as an alternative to gear pump-assisted extrusion control. Basically, gravimetric extrusion control utilizes a special hopper for weighing the material input into the extruder over the course of extruder operation to determine the rate of material consumption by the extruder, with variations in the extruder consumption being utilized to adjust the rotational speed of the extruder screw to more uniformly control the rate at which the extruder output of molten thermoplastic material is delivered to the die. Disadvantageously, however, gravimetric control systems are generally ineffective for controlling short term fluctuations in the product output of an extruding system.

SUMMARY OF THE INVENTION

It is accordingly an object of the present invention to provide a method and apparatus for controlling the output of a thermoplastic material extrusion system which achieves the desirable advantages of both gear pump-assisted systems and gravimetric control systems while eliminating the disadvantages of each.

Basically, the present invention is founded on the recognition that gear pump-assisted extrusion control and gravimetric extrusion control need not be utilized as mutually exclusive alternatives to one another as is the currently conventional wisdom. Thus, the extrusion control method and apparatus of the present invention contemplates a thermoplastic material extrusion system comprising an extruder fed with thermoplastic material from a gravimetric weighing arrangement, with a rotary gear pump interposed between the extruder and a selected die and with a driven output device, e.g. a puller, downline from the die.

According to the extrusion control method and apparatus of the present invention, the speed of operation of either the gear pump or the output device is adjustably controlled in relation to fluctuations in at least the material input to the extrusion system. Specifically, the gravimetric weighing arrangement is adapted to at least periodically determine a value representing material input to the extruder. A suitable arrangement is provided for comparing the determined input value to a predetermined desired material output value from the output device and is operatively associated with either the gear pump or the output device to adjust its speed of operation to compensate for any deviation of the input value from the predetermined output value.

In one preferred embodiment of the present method and apparatus, a suitable arrangement is also provided for determining at least periodically a value representing material output from the output device and the comparing arrangement is adapted to compare the determined output value to the predetermined output value. In such embodiment, the speed of operation of the gear pump is adjusted to compensate for deviation of either determined input or output value from the predetermined output value. Preferably, the input value to be determined is a value representing the rate of material input to the extruder and, likewise, the output value to be determined is a value representing the rate of material output from the output device.

Preferably, a programmable microprocessor or other suitable master controller is utilized for performing the control functions of the present method and apparatus. Specifically, in one preferred embodiment, the controller is operatively associated with the output device situated downstream of the die to continuously measure the length of material output from the output device, based upon which the controller continuously calculates the speed of material output in measured length per unit time of extruder operation and the corresponding rate of material output in weight per unit time based upon the calculated material output speed and a desired weight per unit length of material output. The gravimetric weighing arrangement utilizes a load cell associated with a weighing hopper to continuously supply the controller with a weight loss signal from which the controller continuously calculates the rate of material input to the extruder in material weight per unit time of extruder operation. To provide a realistic indication of the actual rate of material consumption by the extruder, the controller averages the input rate calculations made over a predetermined interval of time of extruder operation.

As necessary or desirable, the controller also may be operatively associated with a sensor for measuring material pressure at the inlet to the gear pump or differentially across the gear pump and may be operatively associated with the extruder to adjust its speed of operation to compensate for deviation of the measured material pressure from a predetermined value for material pressure entering the gear pump.

Optionally, a blending device or mechanism, such as a motionless mixing device, may be situated between the gear pump and the die to homogenize the thermoplastic material before passage through the die in order to reduce temperature gradients therein.

BRIEF DESCRIPTION OF THE DRAWING

The accompanying drawing is a schematic diagram of a thermoplastic material extrusion system incorporating a combined gear pump and gravimetric extrusion control arrangement according to the preferred embodiment of the present invention.

DESCRIPTION OF THE PREFERRED EMBODIMENT

Referring now to the accompanying drawing, an extruder system according to the preferred embodiment of the present invention is schematically illustrated and indicated generally at 10. The extruder system 10 utilizes a conventional screw-type extruder assembly 12 having a horizontally disposed cylindrical housing or barrel 14 within which an elongate threaded conveyor screw (not shown) is rotatably driven by a variable speed screw motor M1 for transporting thermoplastic material through the extruder barrel. The extruder 12 is equipped with suitable means (not shown) for heating thermoplastic charge material to its melting point as the material is conveyed by the screw through the barrel 14. Any conventional heating arrangement may be utilized, e.g., barrel heaters or an internal heater cartridge within the conveyor screw or both.

One end of the extruder barrel 14 is formed with a material intake opening 16 which communicates with a gravimetric weighing hopper apparatus, generally indicated at 18, for supplying thermoplastic working material to the extrusion system 10. The gravimetric hopper apparatus 18 basically includes a weighing hopper 20 mounted to the extruder barrel 14 at the intake opening 16 and a supply hopper 22 mounted above the weighing hopper 20. The supply hopper 22 is filled with the main supply of thermoplastic material for processing through the extrusion system 10, the lower discharge end of the supply hopper 22 being equipped with a selectively openable and closable valve 24 for periodically charging the weighing hopper 20 with smaller quantities of the thermoplastic material for feeding into the extruder barrel 14 through its intake opening 16. The material container of the weighing hopper 20 is supported on one or more load cells 26 adapted to continuously determine the actual weight of thermoplastic material within the weighing hopper 20.

The load cell or cells 26 are operatively connected to a central controller 28, preferably in the form of a microprocessor or other suitable programmable controller, which is programmed to continuously calculate a value representing the extruder's rate of consumption of the thermoplastic material in weight per unit time of extruder operation based upon the weight signals supplied by the load cell or cells 26 indicating the progressively decreasing weight of thermoplastic material remaining in the weighing hopper 20 as the material is gradually supplied into the extruder barrel 14 during the ongoing operation of the extrusion system 10. Essentially, the load cell or cells 26 deliver weight signals to the controller 28 at least several times per second during the extrusion operation and, in turn, the controller 28 repetitively computes the corresponding instantaneous rate of material consumption by the extruder 12. However, as will be understood, these individual consumption rate calculations involve much too short a term of extruder operation to provide a valid indication of the actual long term rate of material consumption. Accordingly, the controller 28 is programmed to average the instantaneous rate computations made over a predetermined time interval of extruder operation, e.g., several minutes, to develop a more accurate indication of the actual long term rate of material consumption.

The controller 28 is also operatively associated with the valve 24 to actuate opening thereof when the weight of material remaining in the weighing hopper 20, as indicated by the signals from the load cell or cells 26, reaches a predetermined minimum and subsequently to close the valve 24 when the load cell signals indicate the weight of material in the weighing hopper 20 has reached a predetermined maximum.

The discharge end of the extruder barrel 14 opposite the material intake end has a central discharge opening coaxial with the conveyor screw through which the molten thermoplastic material is delivered to a filtration device 30, preferably in the form of a so-called screenchanger. Basically, the screenchanger device 30 provides a filtration housing through which the molten thermoplastic material is conveyed. A filter wheel (not shown) fitted with a plurality of individual screen segments is rotatably supported by the housing for indexably moving the screen segments in sequence through the housing interior by means of a gear train meshing with the filter wheel the actuation of which is controlled by the controller 28. A sensor P1 is situated intermediate the discharge opening of the extruder 12 and the screenchanger device 30 for detecting the prevailing pressure of the thermoplastic material entering the screenchanger device 30. The controller 28 is operatively associated with the sensor P1 to monitor the prevailing material pressure detected thereby, the controller 28 being programmed to compare the detected pressure against a predetermined maximum desirable pressure of the material entering the screenchanger device 30 and to actuate indexing of its filter wheel when the predetermined maximum pressure is exceeded. In this manner, a relatively clean screen segment is maintained within the housing of the screenchanger device 30 so that its filtering operation does not produce significant pressure fluctuations over the course of operation of the extrusion system 10.

The discharge side of the screenchanger device 30 is communicated with the intake side of a gear pump 34 of the conventional type having an outer body or housing 36 interiorly supporting a pair of counter-rotating intermeshing gears 38 which convey the incoming thermoplastic material in a positive displacement manner along the housing wall surfaces bounding the gears 38 within the cavities defined by the gear teeth. The material thusly conveyed by each gear 38 rejoins to form a single stream of material which is discharged at the opposite outlet side of the gear pump 34. The gears 38 of the gear pump 34 are driven by a variable speed drive motor M2 controlled by the controller 28 as more fully described hereinafter.

Another pressure sensor P2 is situated intermediate the screenchanger device 30 and the gear pump 34 for detecting the prevailing pressure in the thermoplastic material entering the gear pump 34 and is operatively associated with the controller 28 to deliver the detected pressure readings to the controller 28. The controller 28 is operatively associated with the variable speed motor M1 to control the rotational speed of the conveying screw of the extruder 12, the controller 28 being programmed to adjust the operational speed of the motor M1 to compensate for fluctuations in the material pressure detected by the sensor P2 so as to maintain a predetermined amount of suction pressure at the inlet of the gear pump 34 sufficient to insure that the pump cavities defined by the gear teeth are fully supplied with thermoplastic material. As will be understood, the material pressure alternatively may be sensed differentially across the gear pump 34 for monitoring pressure fluctuations in the material for use in adjusting the extruder speed.

The discharge side of the gear pump 34 is communicated with a material blending device 40, preferably in the form of a conventional motionless mixing device of the type basically including a cylindrical tubular housing in which a plurality of helical baffle elements (not shown) are connected in coaxial end-to-end relation with their adjacent edges offset from one another. Thus, the baffle elements mix or blend the melted thermoplastic material by repetitively dividing and recombining the flow of material discharged from the gear pump 34, thereby effectively homogenizing the thermoplastic material to significantly reduce temperature gradients therein.

The outlet end of the motionless mixing device 40 is communicated with the inlet side of a suitable extruding die 42, which may be of any conventional type and configuration to produce the desired extruded product. Upon discharge from the die 42, the extruded product is passed through a conventional sizing unit 44 to correct any dimensional irregularities and subsequently through a conventional cooling unit 46 to solidify and cure the extruded product. A so-called puller unit 48 follows the cooling unit 46 for continuously drawing the extruded product through the sizing and cooling units 44, 46 by means of an opposed pair of conveyor belts 50 driven by a variable speed drive motor M3 under the control of the controller 28. A sensor 52 is associated with one of the conveyor belts 50 for measuring the actual length of extruded product passing through the puller unit 48. The controller 28 is operatively associated with the sensor 52 and is programmed to calculate therefrom the actual prevailing rate of extruded product output from the extrusion system 10 in length per unit time of system operation.

According to the present invention, the controller 28 is programmed to vary the speed of operation of the gear pump 34 through its drive motor M2 to maintain a predetermined weight per unit length, or so-called meterweight, of the finished extruded product delivered from the puller 48. Upon start-up of the extrusion system 10, a desired operating speed for the extrusion system as measured in product output length per unit time is selected and input to the controller 28. Likewise, the desired product meterweight is input to the controller 28. The controller 28 is programmed to calculate, in turn, the necessary rate of output of the extrusion system 10 as measured in weight per unit time of operation of the extruder system 10 based upon the selected system speed and the desired weight per unit length of the finished product, according to the following equation:

$$Qm = W(v)(k1)(1000)$$

where Qm is the calculated system output rate in weight per unit time (kilograms per hour), W is the desired weight per unit length of the finished extruded product (grams per meter), v is the speed of operation of the extrusion system in product output length per unit time (meters per minute), k1 is a time conversion factor (60 minutes per hour) and 1000 is a weight conversion factor (1000 grams per kilogram). From the calculated output rate (Qm), the controller 28 extrapolates the necessary drive speed of the gear pump motor M2 to achieve a speed of operation of the gear pump 34 sufficient to pump molten thermoplastic material under pressure through the die 42 to achieve the calculated output rate. Likewise, the controller 28 in turn extrapolates the necessary operational speed of the extruder motor M1 to achieve a rotational speed of the conveyor screw sufficient to deliver molten thermoplastic material to the inlet side of the gear pump 34 at the desired level of intake suction pressure.

Following initial system start-up, the controller 28 continuously calculates the actual speed of product delivery from the puller unit 48 in length per unit time based on the product length measurements supplied by the sensor 52, in order to monitor fluctuations in the product output speed and corresponding fluctuations in the product output rate according to the aforesaid equation. The controller 28 compensates for any such output speed and output rate fluctuations by adjusting the speed of operation of the gear pump 34 through its drive motor M2 as necessary to obtain the desired output rate. As will be understood, this manner of adjusting the operational speed of the gear pump 34 advantageously provides effective control of both long and short term variations in the rate of product output from the extrusion system 10 and in the desired weight per unit length of the product, provided that the density of the molten thermoplastic material is uniform. However, it will be recognized as well that fluctuations in material density can adversely affect the system output rate and product weight per unit length for which the described speed-responsive adjustments of the gear pump is incapable of correcting.

Accordingly, the controller 28 is also programmed to continuously monitor fluctuations in the rate of material input into the extruder calculated as aforedescribed from the weight loss signals generated by the load cell or cells 26 of the gravimetric weighing hopper 20, which fluctuations indicate deviations in the actual rate of product output by the extrusion system from the calculated output rate. In turn, the controller 28 is programmed to actuate adjustments in the operating speed of the drive motor M2 to the gear pump 34 sufficient to compensate for such fluctuations in the product input rate. As will be understood, since the load cell or cells 26 of the gravimetric weighing hopper 20 measure the weight rather than volume of the material input to the extruder 12, detected fluctuations in the material input rate necessarily reflect any variations in the material density, thus enabling the controller 28 to make appropriate corrections for density variations which are not recognized and corrected through the above-described speed-responsive adjustments to the gear pump 34. As will thus be understood, the novel combined usage of gravimetric and gear pump control of an extrusion system in accordance with the present invention uniquely achieves the desirable advantages of both types of extruder control while eliminating the deficiencies each control system suffers individually.

While the extruding method and apparatus of the present invention have herein been described and illustrated with respect to one preferred embodiment for combining a thermoplastic extruder with both a gravimetric-based material supply arrangement and a gear pump extrudate pressurization arrangement for controlling deviations in the extruder output from predetermined desired output parameters, those persons skilled in the art will readily recognize that other possible extrusion control systems utilizing both gravimetric material supply and gear pump melt pressurization are within the fundamental scope of the present invention. For example, the controller may be programmed to adjust the operational speed of the gear pump based solely on variations in the rate of material input as determined by the gravimetric weighing hopper. Alternatively, the controller may be programmed to adjust the operational speed of the puller based on variations in the rate of material input determined by the gravimetric weighing hopper, without adjusting the speed of operation of the gear pump. In either case, the combination of both a gravimetric weighing hopper and a gear pump in a thermoplastic extrusion line produces enhanced results and distinct advantages over conventional extrusion control systems utilizing only gear pump or gravimetric control. Accordingly, these alternative embodiments of the present invention, as well as other combined gear pump and gravimetric extrusion control systems, are considered to be within the fundamental scope and substance of the present invention.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a method of extruding thermoplastic material comprising passing said material successively through an extruder, a variable speed rotary gear pump, a die, and a variable speed driven output device, the improvement comprising controlling the speed of operation of at least one of said gear pump and said driven output device by at least periodically determining a value representing material output volume from said output device, at least periodically determining a value representing material input density to said extruder, adjusting the speed of operation of said gear pump to compensate for fluctuations in the determined output value, and adjusting the speed of operation of one of said gear pump and said output device to compensate for fluctuations in the determined input value.

2. The improvement in a method of extruding thermoplastic material according to claim 1 wherein said second-mentioned adjusting step comprises further adjusting the speed of operation of said gear pump to compensate for fluctuations in the determined input value.

3. The improvement in a method of extruding thermoplastic material according to claim 1 wherein said determined input value is a value representing a rate of material input to said extruder and said determined output value is a value representing a rate of material output from said output device.

4. The improvement in a method of extruding thermoplastic material according to claim 1 wherein said material input determining comprises weighing a material input to the extruder and calculating a weight of material input per unit of time of extruder operation.

5. The improvement in a method of extruding thermoplastic material according to claim 4 wherein said material input determining comprises performing said weighing and said calculating generally continuously, and averaging the calculations made over a predetermined interval of time of extruder operation.

6. The improvement in a method of extruding thermoplastic material according to claim 2 wherein said material output determining comprises measuring the speed of material output from said output device and calculating a corresponding material output rate according to the equation:

$$Qm = W(v)(k1)(1000)$$

wherein Qm is the corresponding material output rate to be calculated, W is a predetermined weight per unit length of the material output from the output device, v is the speed of material output from the output device in length per unit time, and k1 is a time constant value.

7. The improvement in a method of extruding thermoplastic material according to claim 1 wherein said extruder is operable at variable speeds and comprising further controlling the speed of operation of said extruder by measuring material pressure at least at an inlet of said gear pump and adjusting the speed of operation of said extruder to compensate for deviation of the measured material pressure from a predetermined value for material pressure at the inlet of said gear pump.

8. The improvement in a method of extruding thermoplastic material according to claim 1 and comprising further blending said material intermediate said gear pump and said die to homogenize said material to reduce temperature gradients therein.

9. The improvement in a method of extruding thermoplastic material according to claim 8 wherein said blending comprises passing said material through a motionless mixing device.

10. In an apparatus for extruding thermoplastic material comprising an extruder, a variable speed rotary gear pump, a die, and a variable speed driven output device arranged for material passage successively therethrough, the improvement comprising means for controlling the speed of operation of at least one of said gear pump and said output device, said controlling means including means for at least periodically determining a value representing material output volume from said output device, means for at least periodically determining a value representing material input density to said extruder, first means for adjusting the speed of operation of said gear pump to compensate for fluctuations in the determined output value, and second means for adjusting the speed of operation of one of said gear pump and said output device to compensate for fluctuations in the determined input value.

11. The improvement in an apparatus for extruding thermoplastic material according to claim 10 wherein said second adjusting means comprises means for further adjusting the speed of operation of said gear pump to compensate for fluctuations in the determined input value.

12. The improvement in an apparatus for extruding thermoplastic material according to claim 11 wherein said determined input value is a value representing a rate of material input to said extruder and said determined output value is a value representing a rate of material output from said output device.

13. The improvement in an apparatus for extruding thermoplastic material according to claim 10 wherein said material input determining means comprises means for weighing material input to the extruder and means for calculating a weight of material input per unit of time of extruder operation.

14. The improvement in an apparatus for extruding thermoplastic material according to claim 13 wherein said weighing means and said calculating means operate generally continuously, said material input determining means further comprising means for averaging the calculations made over a predetermined interval of time of extruder operation.

15. The improvement in an apparatus for extruding thermoplastic material according to claim 11 wherein said material output determining means comprises means for measuring the speed of material output from said output device and means for calculating a corresponding material output rate according to the equation:

$$Qm = W(v)(k1)(1000)$$

wherein Qm is the corresponding material output rate to be calculated, W is a predetermined weight per unit length of the material output from the output device, v is the speed of material output from the output device in length per unit time, and k1 is a time constant value.

16. The improvement in an apparatus for extruding thermoplastic material according to claim 10 wherein said extruder is operable at variable speeds and comprising further means for controlling the speed of operation of said extruder including means for measuring material pressure at least at a inlet of said gear pump and means for adjusting the speed of operation of said extruder to compensate for deviation of the measured material pressure from a predetermined value for material pressure at the inlet of said gear pump.

17. The improvement in an apparatus for extruding thermoplastic material according to claim 10 and comprising further means for blending said material intermediate said gear pump and said die to homogenize said material to reduce temperature gradients therein.

18. The improvement in an apparatus for extruding thermoplastic material according to claim 17 wherein said blending means comprises a motionless mixing device.

* * * * *